(12) United States Patent
Scholt et al.

(10) Patent No.: US 9,074,522 B2
(45) Date of Patent: Jul. 7, 2015

(54) FOUR-WAY EXHAUST GAS VALVE

(71) Applicant: Eberspaecher Exhaust Technology GmbH & Co. KG, Neunkirchen (DE)

(72) Inventors: Denis Scholt, Albershausen (DE); Christoph Illi, Ostfildern (DE); Rolf Duerrstein, Bietigheim-Bissingen (DE); Georg Wirth, Kirchheim unter Teck (DE)

(73) Assignee: EBERSPAECHER EXHAUST TECHNOLOGY GMBH & CO. KG, Neunkirchen (DE)

( * ) Notice: Subject to any disclaimer, the term of this patent is extended or adjusted under 35 U.S.C. 154(b) by 0 days.

(21) Appl. No.: 13/974,500

(22) Filed: Aug. 23, 2013

(65) Prior Publication Data

US 2014/0053549 A1     Feb. 27, 2014

(30) Foreign Application Priority Data

Aug. 24, 2012   (DE) .................. 10 2012 107 839

(51) Int. Cl.
  *F01N 3/10* (2006.01)
  *F02B 33/00* (2006.01)
  *F16K 11/052* (2006.01)
  *F02M 25/07* (2006.01)

(52) U.S. Cl.
  CPC . *F02B 33/00* (2013.01); *F01N 3/10* (2013.01); *F02M 25/0793* (2013.01); *F02M 25/0796* (2013.01); *F16K 11/0525* (2013.01); *F01N 2240/10* (2013.01); *F01N 2240/36* (2013.01); *F01N 2260/08* (2013.01); *F01N 2390/02* (2013.01); *F01N 2410/03* (2013.01); *F01N 2410/06* (2013.01)

(58) Field of Classification Search
  USPC .......... 60/280, 287, 288, 292, 295, 296, 397, 60/299, 305, 311, 320, 323, 324
  See application file for complete search history.

(56) References Cited

U.S. PATENT DOCUMENTS

| 4,155,338 A | 5/1979 | Geiger et al. |
| 4,739,796 A | 4/1988 | Harding et al. |
| 5,130,099 A | 7/1992 | Schatz |
| 6,378,509 B1 | 4/2002 | Feucht et al. |

(Continued)

FOREIGN PATENT DOCUMENTS

| DE | 2712729 | 9/1978 |
| DE | 10 2004 052 107 | 5/2006 |

(Continued)

OTHER PUBLICATIONS

Wikipedia,"Latentwäarmespeicher", Aug. 17, 2012.

(Continued)

*Primary Examiner* — Binh Q Tran
(74) *Attorney, Agent, or Firm* — Morris & Kamlay LLP

(57) ABSTRACT

A four-way exhaust gas valve has a permanent inlet, a permanent outlet, a selectable inlet, a selectable outlet and a pivotable valve flap. The pivotable valve flap is arranged for switching between a first mode of operation, in which exhaust gas entering through the permanent inlet is guided directly to the permanent outlet, and a second mode of operation, in which exhaust gas entering through the permanent inlet is discharged through the selectable outlet and exhaust gas re-entering through the selectable inlet is discharged through the permanent outlet.

25 Claims, 4 Drawing Sheets

(56) References Cited

U.S. PATENT DOCUMENTS

| | | | | |
|---|---|---|---|---|
| 6,408,620 | B2* | 6/2002 | Boegner et al. | 60/295 |
| 6,820,417 | B2* | 11/2004 | May et al. | 60/297 |
| 7,343,736 | B2* | 3/2008 | Kalish | 60/288 |
| 7,398,645 | B2* | 7/2008 | Zheng et al. | 60/288 |
| 7,461,641 | B1* | 12/2008 | Styles et al. | 123/568.12 |
| 7,827,782 | B2* | 11/2010 | Theis | 60/286 |
| 8,318,370 | B2* | 11/2012 | Keogh | 429/439 |
| 2008/0184974 | A1 | 8/2008 | Kobayashi et al. | |
| 2009/0235654 | A1 | 9/2009 | Kobayashi et al. | |
| 2012/0090293 | A1 | 4/2012 | Barrieu | |

FOREIGN PATENT DOCUMENTS

| | | |
|---|---|---|
| DE | 102008000223 | 8/2008 |
| DE | 102009001530 | 9/2009 |
| DE | 102008048912 | 4/2010 |
| DE | 102010023412 | 12/2011 |
| DE | 102011016630 A1 | 10/2012 |
| EP | 0 651 205 | 5/1995 |
| EP | 2395216 | 12/2011 |
| JP | S381963003964 | 3/1963 |
| JP | 61178060 | 11/1986 |
| JP | H03096613 | 4/1991 |
| JP | H071995041241 | 7/1995 |
| JP | 2008-25450 | 2/2008 |
| JP | 2012522920 A | 9/2012 |
| WO | 2010034450 | 4/2010 |

OTHER PUBLICATIONS

European Patent Office, Extended European Search Report in Application No. 13004058.7-1606, Nov. 20, 2013.

Japanese Office Action in Application No. JP 2013-172978 Mailed Aug. 5, 2014.

* cited by examiner

FOUR-WAY EXHAUST GAS VALVE

CROSS-REFERENCES TO RELATED APPLICATIONS

This application claims priority to Patent Application No. 10 2012 107 839.4, filed Aug. 24, 2012 in Germany, the entire contents of which are incorporated by reference herein.

FIELD

The present application relates to a four-way exhaust gas valve, in particular for selectively coupling or decoupling, respectively, a latent heat reservoir into/from an exhaust gas stream in certain operational situations of an internal combustion engine. Such exhaust gas valves are sometimes termed four-way butterfly valves.

BACKGROUND

The after-treatment of exhaust gas of internal combustion engines is commonly constructed of passive systems, which in all operational situations are entirely flown through by the exhaust gas. When flowing through the system, the exhaust gas experiences some resistance, which reduces the overall efficiency of the system. For reducing emissions and exhaust gas noise in common operational situations of low load, it would be desirable to have available switchable systems in which parts of the exhaust gas apparatus are closed or decoupled by control members, and only partial regions are used.

For example, it is known from international application WO 2010/034450 A1 (in particular FIGS. 1 to 3 thereof) to recirculate part of the exhaust gas stream into the internal combustion engine via a recirculation duct by means of an exhaust gas valve.

If an exhaust gas main pipe is to be closed for the full exhaust gas volume stream, and the exhaust gas stream is to be diverted via separate member upstream of the closure, and is to be reintroduced via a further member downstream of the closure, several of the known valves have to foe employed and coordinated in the system, resulting in an according space requirement and effort for the actuating and addressing.

Furthermore, it is known to charge a latent heat reservoir with the engine heat of a vehicle, and to release the energy stored in the latent heat reservoir at cold starting.

SUMMARY

In embodiments, an exhaust gas valve is provided which allows the selective coupling of sections of an exhaust gas apparatus in a simple, robust and cost-efficient manner.

Embodiments of a four-way exhaust gas valve have a permanent inlet, a permanent outlet, a selectable outlet, a selectable inlet and a valve flap pivotable between a first and a second sealing position. The valve flap is arranged to switch between a first mode of operation, in which exhaust gas entering in through the permanent inlet is directly guided to the permanent outlet, and a second mode of operation, in which exhaust gas entering through the permanent inlet is discharged through the selectable outlet, and exhaust gas re-entering through the selectable inlet is discharged through the permanent inlet. Herein, a pivot axis of the valve flap is arranged between the permanent inlet and the selectable inlet, and between the permanent outlet and the selectable outlet. The pivot axis transects a valve body of the four-way exhaust gas valve and in this manner, allows a pivotable arrangement of the valve flap in the interior of the valve body. The permanent inlet is connectable to an exhaust gas outlet of an internal combustion engine, and the permanent outlet is connectable to a silencer. The selectable outlet is connectable to an inlet of a latent heat reservoir and the selectable inlet is connect able to an outlet of the latent heat reservoir. The valve flap is rotationally fixedly mounted on the pivot axis and is thereby forcedly pivotable by rotation of the pivot axis.

In this way, it is possible in a simple manner to guide the entire exhaust gas stream in pre-selected operational situations, or upon requests directly to the exhaust gas outlet, or else to first guide it through a further component, such as a latent heat reservoir, and afterwards to the exhaust gas outlet.

According to an embodiment, the valve body is formed together with the inlets and outlets from a common, drawn metal sheet. Therefore, the inlets and outlets are integrally formed with the valve body as cup-shaped protrusions (sometimes termed "slug"), and for being connected to a pipe may simply foe opened by punching or cutting. In this manner, all the inlets and outlets may be formed together with the valve body with a common tool. In addition, excellent sealing can be ensured for the inlets and outlets on the valve body.

According to an embodiment, the valve flap is rigid with respect to bending, is flat (plane), and has a shape generally corresponding to that of the cross-section of the space enclosed by the valve body, but is slightly smaller. Herein, "slightly smaller" means that with respect to the cross-section of the space enclosed by the valve body, a tolerance gap of the valve flap of larger than 0.1 mm and smaller than 2 mm exists.

According to an embodiment, the pivot axis is supported by the valve body and in the bearing region has a bearing seal, in particular a shaft packing ring, a glide ring seal, a redial shaft seal, an end face mechanical seal, a compression seal fitting, or a packing box. In this manner, the leaking of a fluid such as exhaust gas of a internal combustion engine guided in the valve body, can be prevented.

According to an embodiment, the bearing regions of the pivot axis are connected by means of covers connected to the valve body in a fluid-tight manner.

According to an embodiment, the pivot axis at its one end has a drive, the casing of which is rotationally fixedly mounted on the valve body, and the shaft of which is force-fittingly connected to the pivot axis. The drive may be actuated by a coaxially arranged rotary magnet.

According to an embodiment, a first flow direction in one of the inlets or outlets, respectively, is in a different plane than the flow directions of the remaining inlets and outlets, respectively, which are mutually coplanar. According to an embodiment, the different plane is non-parallel to the plane of the other flow directions.

According to an embodiment, the flow directions in three of the inlets and outlets, respectively, are mutually coplanar, and the remaining, fourth flow direction is perpendicular to a plane spanned by the other, coplanar flow directions. In this manner, depending on the mounting situation, a more compact arrangement is possible, because the lateral extension is reduced. In addition, in this construction it is easier to provide larger connection cross-sections for the same valve size, or, for a given connection cross-section, a smaller valve size, because the connection diameters may be arranged around the periphery of the valve body more favorably.

According to another embodiment, all four flow directions of the exhaust gas in the four inlets and outlets, respectively, are coplanar and therefore lie in the same plane. This enables a particularly flat construction and also renders the bearing and actuation of the valve flap more easy. It is further possible in this manner to avoid excess deflections of the exhaust gas guided in the valve body, which would lead to pressure losses.

According to an embodiment, the flow direction of the exhaust gas in the permanent inlet, together with the flow direction of the exhaust gas in the selectable outlet, defines a first deflection plane; and the flow direction of the exhaust gas in the selectable inlet, together with the flow direction of the exhaust gas in the permanent outlet, defines a second deflection plane; and the first and second deflection planes include an inter-planar angle of more than 20° and especially more than 40°.

According to an embodiment, the flow direction of the exhaust gas in the permanent inlet, together with the flow direction of the exhaust gas in the selectable outlet, defines a first deflection plane; and the flow direction of the exhaust gas in the selectable inlet, together with the flow direction of the exhaust gas in the permanent outlet, defines a second deflection plane; and the first and second deflection planes include an inter-planar angle of more than 20° and up to 90°. In this manner, a particularly compact arrangement is achieved. In the case or a complete flow direction reversal, the offset between the two flow directions facing in opposite directions, may be employed to define the deflection plane.

In further embodiments, an angle between the plane normal of the smallest cross-section of the selectable inlet and the plane normal of the smallest cross-section of the selectable outlet, or an angle between the flow direction of the exhaust gas in the selectable inlet and the flow direction of the exhaust gas in the selectable outlet, is less than 70° or less than 40°. Namely, it has been found that a particularly small angle between these two connections allows for accordingly larger angles between the other ones. Herein, always the smallest angle is considered (thus for angles larger than 90°, its difference to 180°). The flow deflection between the other connections provides for an according flow resistance loss with a tendency to increase with the deflection angle, but not between these two. Larger angles between the other connections result in lower deflection angles, and therefore a tendency to smaller losses.

According to an embodiment, a (smallest) angle between the plane normal of the smallest cross section of the permanent inlet and the plane normal of the smallest cross section of the permanent outlet, or a (smallest) angle between the flow direction of the exhaust gas in the permanent inlet and the flow direction of the exhaust gas in the permanent outlet, respectively, is either between 70° and 90°, or less than 30° (i.e. between 0° and 30°).

According to an embodiment, a smallest angle between the plane normal of the smallest cross section of the permanent inlet and the plane normal of the smallest cross section of the selectable outlet, or between the flow direction of the exhaust gas in the permanent inlet and the flow direction of the exhaust gas in the selectable outlet, respectively, and a smallest angle between the plane normal of the smallest cross section of the selectable inlet and the plane normal of the smallest cross section of the permanent outlet, or between the flow direction of the exhaust gas in the selectable inlet and the flow direction of the exhaust gas in the permanent outlet, respectively, is between 70° and 90°, whereby losses may be kept low.

In order to keep losses low, according to an embodiment a deflection angle between the flow direction or the exhaust gas in the permanent inlet and the flow direction of the exhaust gas in the permanent outlet is less than 40°. This arrangement is particularly advantageous in a mode of operation, in which, the conducted exhaust gas is not guided through an additional component of the exhaust gas apparatus such as, e.g., a latent heat reservoir, because the entire exhaust gas volume stream, is guided essentially directly to the exhaust gas outlet.

According to an embodiment, the smallest cross-sectional area of the permanent inlet is larger than a smallest cross-sectional area of the selectable inlet by more than 10%. In this manner, a good adjustment of the permanent inlet to the selectable inlet is achieved.

According to an embodiment, the smallest cross-sectional area of the permanent outlet differs from the smallest cross-sectional area of the permanent inlet by less than 10%.

According to an embodiment, the smallest cross-sectional area of the selectable outlet differs from the smallest cross-sectional area of the selectable inlet by less than 10%.

According to an embodiment, the latter three features are provided simultaneously, i.e. the smallest cross-sectional area of the permanent outlet differs from the smallest cross-sectional area of the permanent inlet by less than 10% and the smallest cross-sectional area of the selectable outlet differs from the smallest cross-sectional area of the selectable inlet by less than 10%. At the same time, the smallest cross-sectional area of the permanent inlet is larger than the smallest cross-sectional area of the selectable inlet by more than 10%, and/or the smallest cross-sectional area of the permanent outlet is larger than the smallest cross-sectional area of the selectable outlet by more than 10%.

By this pair-wise adjustment, it is taken account of the fact that in the operational mode with a coupled-in component, at any rate only a smaller exhaust gas volume stream is to be handled (partial lead operation), and that therefore the entire pipe cross-section of the main exhaust gas stream is not required. This differentiating allows for a smaller construction of the valve.

According to an embodiment, the smallest cross-sectional area of the selectable outlet differs from the smallest cross-sectional area of the permanent inlet by less than 10%.

According to an embodiment, the smallest cross-sectional area of the selectable inlet differs from the smallest cross-sectional area of the permanent outlet by less than 10%.

By this adjustment of the cross-sections of directly subsequent connections, it is achieved that no substantial throttle effects can build up in the valve.

According to a particularly compact embodiment, the valve flap has oval shape with two different diameters and associated radii, wherein the pivot axis suitably is arranged along the shorter of the two diameters and thus along the shorter radius. Furthermore the valve body has an inner wall, which in segments has the shape of a flattened rotation ellipsoid, the rotational axis of which is larger than or equal to the smaller diameter of the valve flap, and the largest diameter of which is larger than or equal to the longer diameter of the valve flap, wherein the pivot axis is arranged in the rotational axis of the rotation ellipsoid.

This construction is already relatively flat. In addition, in this arrangement it is possible to arrange the permanent inlet substantially in parallel to the pivot axis, where a relatively large area for its connection is available, and to arrange the selectable inlet and outlet, respectively, at the relatively narrow periphery of the resulting flattened rotation ellipsoid.

According to an embodiment it is then possible to arrange the permanent outlet in direct line vis-à-vis the permanent inlet, also with a large cross-section. This construction allows low deflection angles in all modes of operation, namely an angle sum of the first deflection angle between the permanent inlet and outlet, the second deflection angle between permanent inlet and selectable outlet, and the third deflection angle between selectable inlet and permanent outlet, of less than 250°, down to 180° (0°+90°+90°). Also, an arrangement is possible in which all three said angles are equal and together amount to only 180° (60°+60°+60°). To this end, it is desirable if the selectable inlet and outlet are oriented parallel to one another. If all four connections are in a mutual tetrahedral arrangement, the three said deflection angles together amount to 212°. There are further solutions between this arrangement, and the one in which the first deflection angle and the angle between the selectable inlet and selectable outlet are very small.

According to an embodiment, the inner surface of the valve body and/or the outer surface of the valve flap are coated with a resilient material, e.g. by spraying. This may enhance the seating property between the valve body and the valve flap, and/or may dampen noise. Herein, the coating thickness is less than 1 mm and in particular less than 0.5 mm.

According to an embodiment, the resilient material is a closed-pore metal foam, as may be applied by flame spraying, or a metal fabric or metal web or a metallic non-woven of a metal felt.

Embodiments of a vehicle have an internal combustion engine with an exhaust gas outlet, a latent heat reservoir, a silencer and a four-way exhaust gas valve flap according to the description above. The permanent inlet of the four-way valve flap is connected to the exhaust gas outlet of the internal combustion engine, and the permanent outlet of the four-way exhaust gas valve flap is connected to the silencer. Furthermore, the selectable outlet and the selectable inlet of the four-way exhaust gas valve are connected to the latent heat reservoir.

According to an embodiment, an exhaust gas turbo charger is arranged between the internal combustion engine and the four-way exhaust gas valve.

According to an embodiment, a catalytic converter and/or a diesel particulate filter are/is arranged between the four-way exhaust gas valve and the silencer.

According to an embodiment, the four-way exhaust gas valve is arranged at an underside of the vehicle. A drive of the valve flap of the four-way exhaust gas valve may then be arranged below the four-way exhaust gas valve, to be cooled by the air flow.

The four-way exhaust gas valve may suitably be manufactured from two half-shells made of sheet metal or cast metal. It is possible to insert into the half-shells, at suitable locations, half-rings or the like to provide sealing contours, so that the valve flap abuts to same in one or both pivot positions.

By sealing the direct exhaust gas path in the case of decoupling the additional component, which may in particular be a latent heat reservoir, automatically an isolation of same from the environment results. This means, that no convective heat transport can occur out of the additional component, in particular the latent heat reservoir, without any second valve needing to be provided and its actuation coordinated. This is particularly useful in periods after stopping the engine of the vehicle, in that it allows the major part of the stored heat to be used to help quickly heating the engine after a subsequent cold start. To this end, the latent heat reservoir suitably combines with a heat exchanger in turn thermally coupled to the engine.

BRIEF DESCRIPTION OF THE DRAWINGS

The foregoing as well as other advantageous features of the disclosure will be more apparent from the following detailed description of exemplary embodiments with reference to the accompanying drawings. Not all possible embodiments may necessarily exhibit each and every, or any, of the advantages identified herein.

DETAILED DESCRIPTION OF EXEMPLARY EMBODIMENTS

Figure 1:
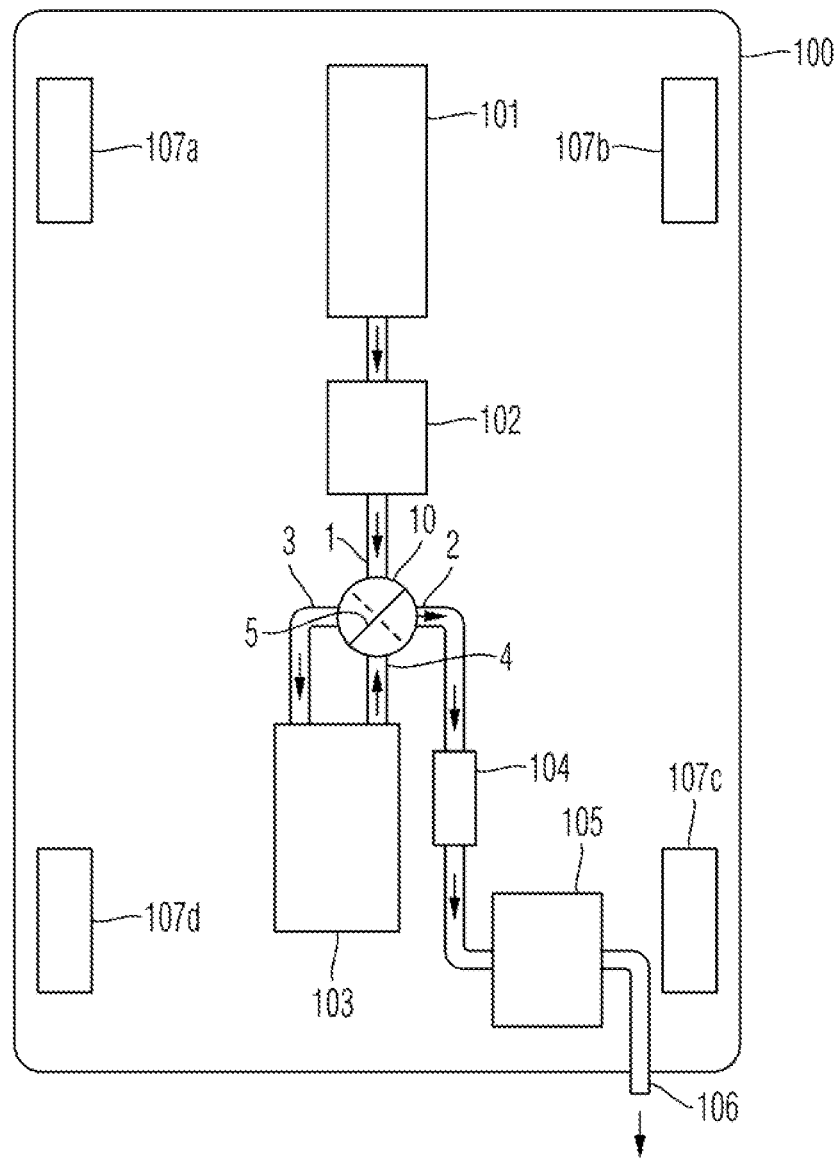
FIG. 1 shows a schematic view of the bottom side of a vehicle with the four-way exhaust gas valve according to the invention.

In the exemplary embodiments described below, components that are alike in function and structure are designated as far as possible by alike reference numerals. Therefore, to understand the features of the individual components of a specific embodiment, the descriptions of other embodiments and of the summary of the disclosure should be referred to.

FIG. 1 schematically shows a bottom view of the bottom side of a vehicle.

Next to the wheels 107a, 107b, 107c and 107d, at the bottom side of the vehicle 100, a bottom part of an internal combustion engine 101, an exhaust gas turbo charger 102, a four-way exhaust gas valve 10 according to the invention, a latent heat reservoir 103, a catalytic converter 104 and a silencer 105 are visible.

The internal, combustion engine 101 is arranged between the front wheels 107a, 107b, and is coupled to the exhaust gas turbo charger 102 in a manner such that exhaust gas discharged from, the internal combustion engine 101 flows through the exhaust gas turbo charger 102. Downstream of the exhaust gas turbo charger 102, the exhaust gas enters into the four-way exhaust gas valve 10 via a permanent inlet 1.

In the position of a valve flap 5 of the four-way exhaust gas valve 10 shown in FIG. 1 in continuous lines, the exhaust gas is guided from the permanent inlet 1 via a selectable outlet 3 to the latent heat reservoir 103, and from the latter via a selectable inlet 4 back into the four-way exhaust gas valve 10, before being discharged via a permanent outlet 2 to the catalytic converter 104. In this way, the latent heat reservoir 103 is loaded and extracts heat from the exhaust gas. In the position of the valve flap 5 of the four-way exhaust gas valve 10 shown in FIG. 1 in dashed lines, the exhaust gas is guided from the permanent inlet 1 directly to the catalytic convert 104 via the permanent outlet 2, without flowing through the latent heat reservoir 103. Unintentional discharge of heat from the latent heat reservoir to the exhaust gas is thereby prevented. Downstream of the catalytic converter 104, the exhaust gas flows through a silencer 105 and is discharged to outside through an end pipe 106 of the vehicle 100. The flow direction of the exhaust gas is indicated by arrows in FIG. 1.

It may be noted that both the exhaust gas turbo charger and the catalytic converter are entirely optional. Alternatively, or additionally to the catalytic converter, a diesel particulate filter may be provided. Furthermore, instead of the latent heat reservoir 103, another facultative system of the exhaust gas system may be provided.

Figure 2:
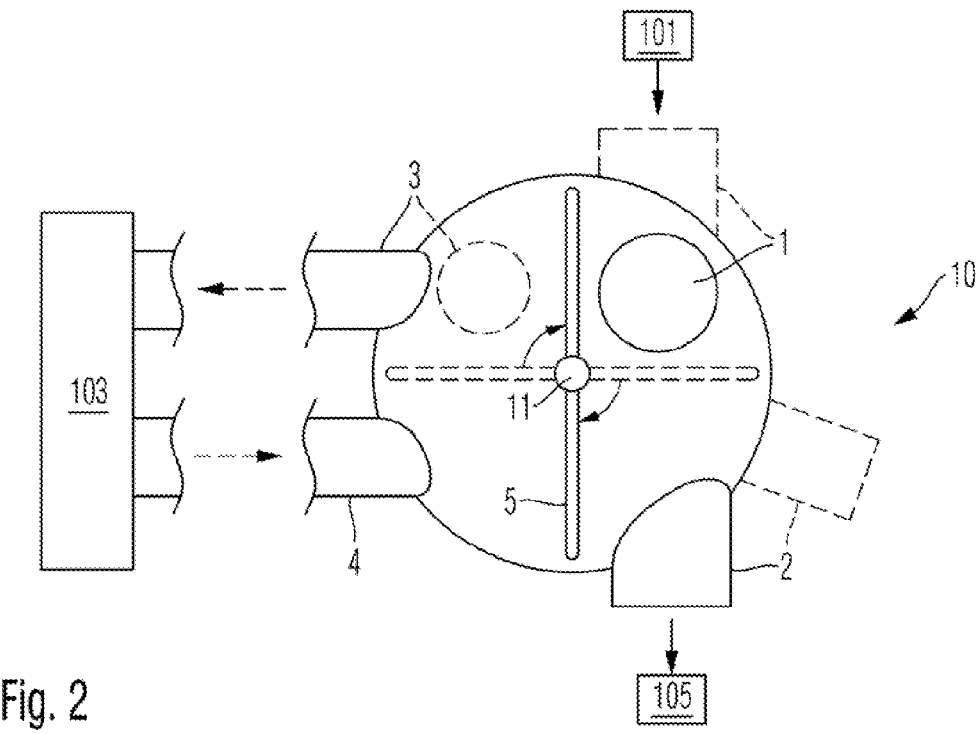
FIG. 2 shows a schematic cross-sectional view, in parallel to its axis, of the four-way exhaust gas valve according to a first embodiment of the invention.

The construction of the four-way exhaust gas valve 10 is schematically shown in FIG. 2. Here, the viewing direction is in parallel to a pivot axis of the valve flap 5.

The pivot axis 11 of the valve flap 5 is centrally supported in a valve body formed of two half-spherical shells. In the embodiment shown, the valve flap 5 is a circular disk rigid with respect to bending, in the diameter of which the pivot axis 11 is arranged, and which is made of sheer steel as are the half-spherical shells forming the valve body. The valve body in its interior has a wall which is part of the surface of a sphere, the radius of which sphere is larger than the radius of the valve flap 5 by 0.5 mm.

The valve flap 5 is rotationally fixedly connected to the pivot axis 11, and is pivotable in the interior of the valve body by approximately 0° by means of a drive for the pivot axis. The extremal positions of the valve flap 5 divide the interior of the valve body into four equal-sized parts. This division into four equal-sized parts is, however, purely optional.

In each of the equal-sized parts, one inlet or outlet is located, so that the in-flowing exhaust gas coming from the internal combustion engine 101 for the exhaust gas turbo charger 102, respectively) via the permanent inlet 1 may be selectively guided, through pivoting the valve flap, either to the selectable outlet 3 (in the position of the valve flap 5 shown in FIG. 2 in dashed lines), or else directly to the permanent outlet 2 (in the position of the valve flap 5 shown in FIG. 2 in continuous lines). It is, however, not possible to guide the in-flowing exhaust gas coming from the internal combustion engine directly to the selectable inlet 4.

If the exhaust gas stream coming from the internal combustion engine 101 is guided through the selectable outlet 3 towards the latent heat reservoir 103, simultaneously the exhaust gas flowing back from same is guided by the valve flap 5 via the permanent outlet 2 to the silencer 105 (or the catalytic converter 104 or diesel particulate filter, respectively).

In FIG. 2, possible variations of the arrangement of three of the inlets and outlets 1, 2, 3, respectively, are indicated by dashed lines; the orientation of each of these connections may be freely selected within, the respective sector, according to the constructional circumstances.

Even though the valve body in the described embodiment has spherical shape, the present invention is not so limited. E.g., other constructions which have a circular cross-section perpendicular to the pivot axis direction, are also possible. In actual fact, even the circular shape is not absolutely necessary, but only in the extremal positions of the valve flap, a close vicinity of the valve body wall to the valve flap is required in order to achieve a certain sealing property. Where the valve flap itself is circular, elliptic or oval, and across the entire switching path shall move close to the valve body wall, it is required that the wall is curved in space, namely is spherical or spheroidal (if the flap is oval). The two mutually opposing segments (to 2 and 3), within which the valve flap moves during switching, may have a larger radius (or a curved shape in the first place) than the two other, again mutually opposed, segments (to 1 and 4), which the valve flap does not wipe across. Thereby, it is possible to form the transition to the smaller segments at the same time as stops for the valve flap, enhancing its sealing characteristic and avoiding having to provide separate sealing elements.

In the embodiment shown, the pivot axis 11 transects the approximately spherical valve body centrally and supports the valve flap 5 in its middle. This is, however, not the only way of arrangement: An off-central, arrangement of the pivot axis in the valve body is likewise possible. This, however, requires an eccentric support of the valve flap and an adjustment of the short side of the valve flap.

Figure 3:
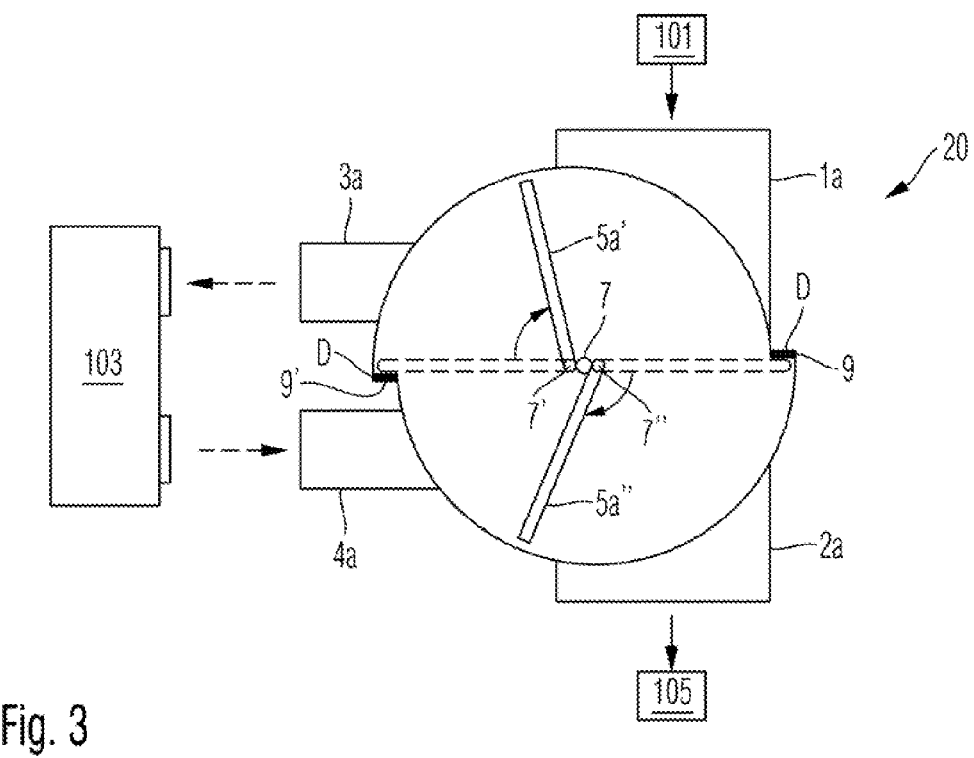
FIG. 3 shows a schematic cross-sectional view, in parallel to its axis, of the four-way exhaust gas valve according to a second embodiment of the invention.

The construction of a four-way exhaust gas valve 20 with two pivot axes 7, 7' according to a second embodiment is shown in FIG. 3 in a cross-sectional view.

In the second embodiment, the valve body of the four-way exhaust gas valve 20 is vertically divided, and the two halves are offset with respect to one another to provide two sealing stops 9, 9'. In this embodiment, the pivot axes 7', 7" of the two sides of the valve flap are separated from one another, so that two valve flaps 5a', 5a" have to be provided. The separation distance is bridged by a lengthwise toothed, common drive axis 7 arranged between the two axes 7', 7", which at the same time enables driving both valve flaps 5a', 5a" with different transmission ratio and thus different switching angle. E.g., it can be achieved in this manner that the valve flaps in one sealing position are in one common plane, but in the other sealing position are in an obtuse angle to one another. This allows the arrangement of a relatively large permanent outlet 2a in the part swept by the large-angle valve flap 5a", and the arrangement of a relatively smaller selectable outlet 3a in the part swept by the other, small-angle valve flap 5a'. In the embodiment shown, the sealing stops 9, 9' are coated with a closed-pore metal foam, to enhance the sealing property and to dampen noise by the abutting valve flaps.

Figure 4:
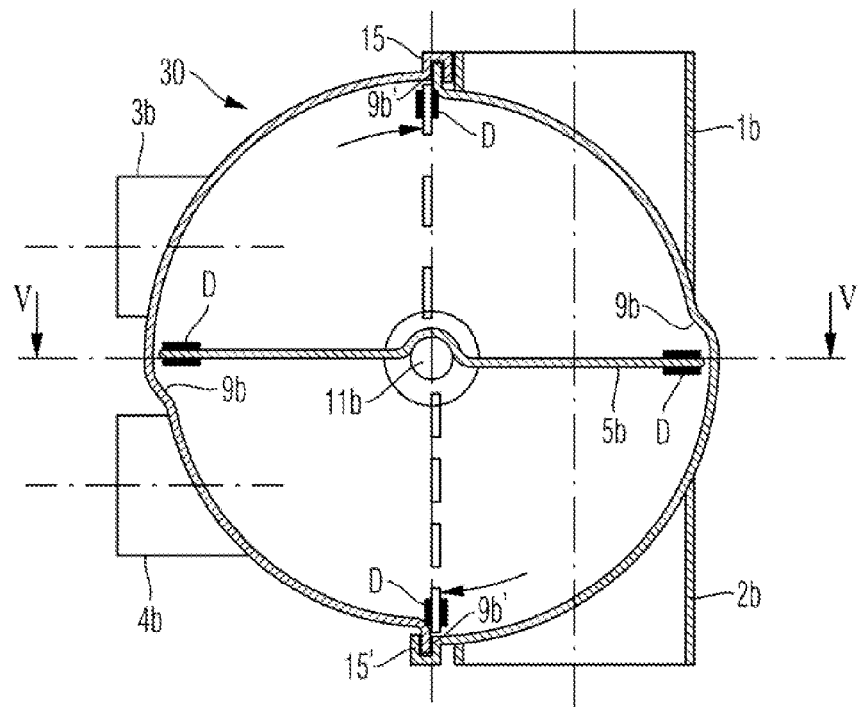
FIG. 4 shows a cross-sectional view, in parallel to its axis, of the four-way exhaust gas valve according to a third embodiment of the invention.
Figure 5:
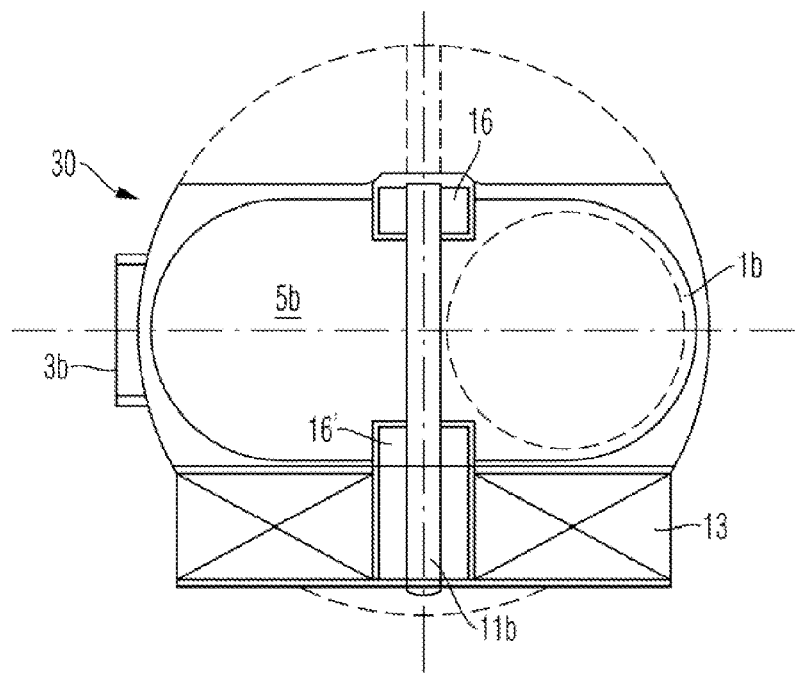
FIG. 5 shows a cross-sectional view, perpendicular to the pivot axis, of the embodiment of FIG. 4.

In FIGS. 4 and 5, a third embodiment of a four-way exhaust gas valve 30 is shown. Here, FIG. 4 shows a cross-sectional view in parallel to the axis, and FIG. 5 shows a cross-sectional view along line V-V. As this third embodiment is very similar to the above described first embodiment, in the following mainly the particularities are emphasized, otherwise referring to the first embodiment.

In the third embodiment, sealing stops 9b, 9b' are provided by, with respect to the pivot axis 11b of the valve flap 5b, oppositely arranged wall segments of the valve body, which have a smaller diameter than adjacent wall sections, that are oppositely arranged with respect to the pivot axis 11b of the valve body 5b. In other words, the inner surface includes steps forming the sealing stops. In order to enhance the sealing property and to dampen noise, the valve flap 5b is coated on its radial outer rim with a closed-pore metal foam D.

As discernible from FIG. 5, the interior of the valve body in this third embodiment has a generally flattened rotation-ellipsoidal shape. In FIG. 5, the spatial reduction in comparison to a spherical shape is indicated by dashed lines. In this embodiment, the space saved below the valve is used for the arrangement of an electromagnet 13 as an actuator for the valve flap 5b, and the space above the valve is used for a bearing 16, 16' of the pivot axis 11b. The bearings 16, 16' are both sealed against the environment.

In FIG. 4, the half-shells forming the valve body are divided by the vertical plane in the drawing, i.e. a plane which contains the pivot axis 11, wherein one half-shell provides the permanent inlet 1b and outlet 2b (here, drawn-in tube socket), and the other half-shell provides the selectable inlet 3b and outlet 4b. At their seams, the two half-shells are crimped with one another.

In this embodiment, the valve body is formed together with the inlets and outlets from a common, drawn metal sheet. The inlets are therefore integrally and seamlessly connected with the valve body as opened, cup-shaped protrusions.

Figure 6:
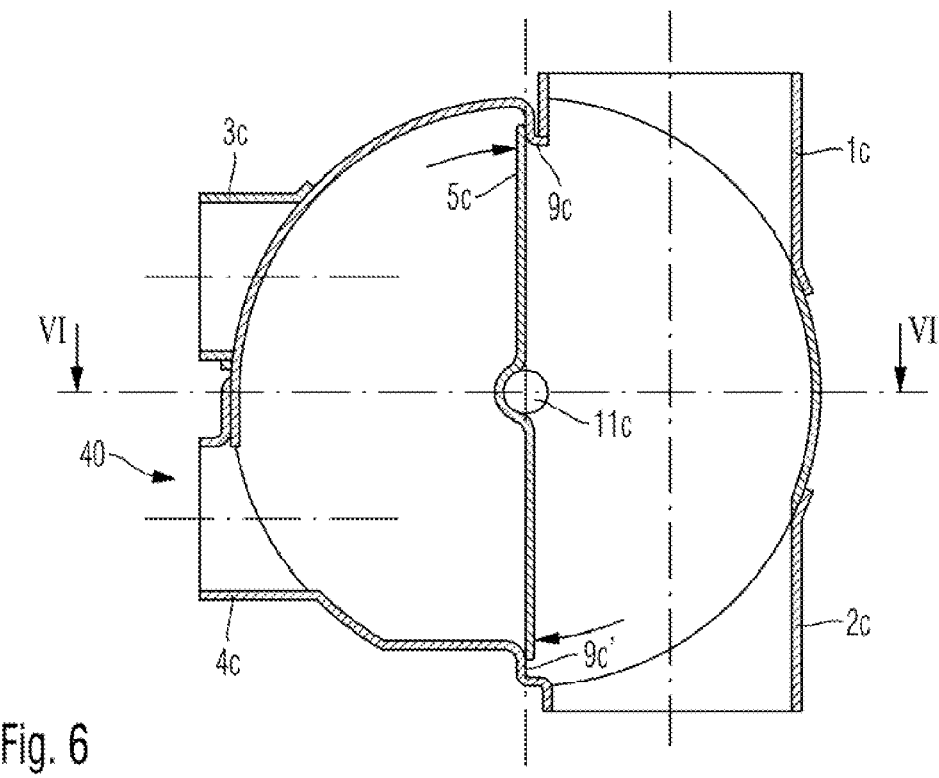
FIG. 6 shows a cross-sectional view, in parallel to its axis, of the four-way exhaust gas valve according to a fourth embodiment of the invention.
Figure 7:
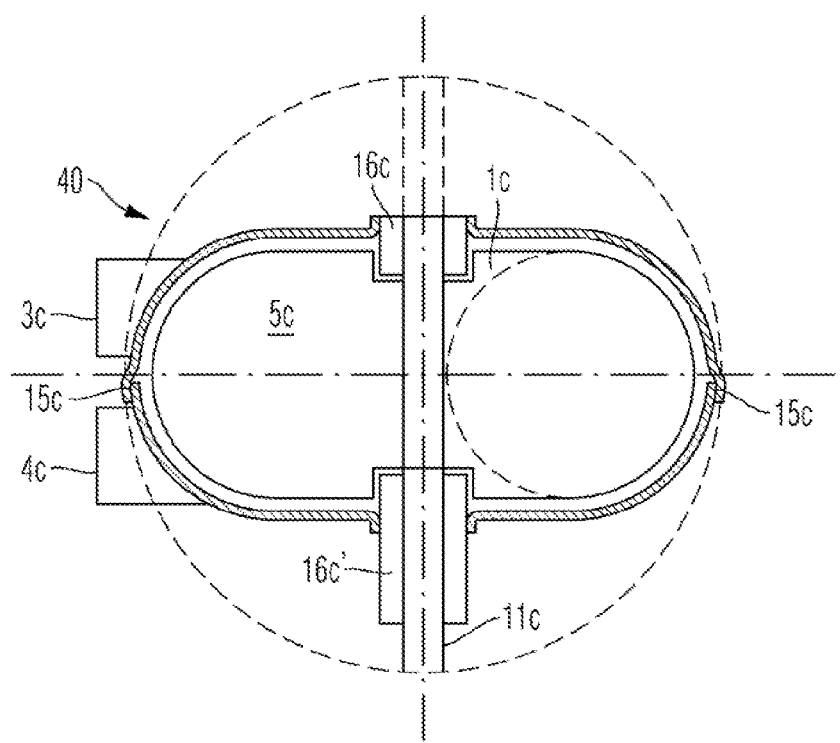
FIG. 7 shows a cross-sectional view, perpendicular to the pivot axis, of the embodiment of FIG. 6.

In FIGS. 6 and 7, a fourth embodiment of a four-way exhaust gas valve 40 is shown. Here, FIG. 6 shows a cross-sectional view in parallel with the axis and FIG. 7 shows a cross-sectional view along the line VI-VI, wherein in FIG. 7, the valve flap 5c is shown rotated by 90° with respect to the position shown in FIG. 6. As this fourth embodiment is very similar to the third embodiment described above, in the following mainly the particularities are emphasized and otherwise, it is referred to the third embodiment.

The valve body of the four-way exhaust gas valve 40, too, is formed of two half-shells. However, the two half-shells of this embodiment are divided along a plane perpendicular to the pivot axis. In this embodiment, the sealing stops 9c, 9c' are provided by inward-deforming regions of the half-shells. In this example, the upper half-shell provides the selectable outlet 3c and an upper part of the permanent inlet 1c and outlet 2c, and the lower half-shell provides the selectable inlet 4c and a lower part of the permanent inlet 1c and outlet 2c. The two half-shells are partially fitted into one another, and are welded together at their connection sites 15c, 15c'. With such a division of the half-shells, the assembly of the pivot axis 11c and the bearings 16c, 16c' for the pivot axis is simplified.

While the disclosure has been described with respect to certain exemplary embodiments thereof, it is evident that many alternatives, modifications and variations will be apparent to those skilled in the art. Accordingly, the exemplary embodiments of the disclosure set forth herein are intended to be illustrative and not limiting in any way. Various changes may be made without departing from the spirit and scope of the present disclosure as defined in the following claims. E.g., it is possible to dispense with the selectable inlet 4c and to operate the device as a three-way valve. This allows to further separate the remaining three connections in terms of angle (e.g. by 120°), and to effect the switching with a non-planar valve flap (e.g. angled by 120°). The recombination of the so-diverted exhaust gas stream with the main exhaust gas duct then occurs through a simple, inverse-mounted pipe branching. Furthermore, it is possible to guide other fluids than exhaust gas with the four-way exhaust gas valve.

What is claimed is:

1. A four-way exhaust gas valve, comprising:
   a permanent inlet;
   a permanent outlet;
   a selectable outlet;
   a selectable inlet; and
   a valve flap pivotable between a first sealing position and a second sealing position, the valve flap for switching between a first mode of operation in which exhaust gas entering through the permanent inlet is directly guided to the permanent outlet, and a second mode of operation in which exhaust gas entering through the permanent inlet is discharged through the selectable outlet, and exhaust gas re entering through the selectable inlet is discharged through the permanent outlet;
   wherein a pivot axis of the valve flap is arranged between the permanent inlet and the selectable inlet, and between the permanent outlet and the selectable outlet, and transects a valve body of the four-way exhaust gas valve;
   wherein a first flow direction of the exhaust gas in one element selected from the inlets and outlets, lies in a different plane than flow directions in the remaining inlets and outlets, respectively, wherein the flow directions in the remaining inlets and outlets, respectively, are mutually coplanar; and
   wherein
      the permanent inlet is adapted to be connected to an exhaust gas outlet of an internal combustion engine;
      the permanent outlet is adapted to be connected to a silencer;
      the selectable outlet is adapted to be connected to a latent heat reservoir; and
      the selectable inlet is adapted to be connected to the latent heat reservoir.

2. The four-way exhaust gas valve of claim 1, wherein the flow direction of the exhaust gas in the permanent inlet together with the flow direction of the exhaust gas in the selectable outlet defines a first deflection plane, and the flow direction of the exhaust gas in the selectable inlet together with the flow direction of the exhaust gas in the permanent outlet defines a second deflection plane, and wherein the first deflection plane and the second deflection plane form an inter-planar angle of more than 20° and up to 90°.

3. The four-way exhaust gas valve of claim 1, wherein the coplanar flow directions of the remaining inlets and outlets, respectively, define a reference plane, and wherein the first flow direction of the exhaust gas is perpendicular to the reference plane so defined.

4. The four-way exhaust gas valve of claim 1,
   wherein a smallest angle between a normal to a plane defined by a smallest cross-section of the selectable inlet, and a normal to a plane defined by a smallest cross-section of the selectable outlet, is less than 70°.

5. The four-way exhaust gas valve of claim 1, wherein a smallest angle between a normal to a plane defined by a smallest cross-section of the permanent inlet, and a normal to a plane defined by a smallest cross-section of the permanent outlet, is between 70° and 90°.

6. The four-way exhaust gas valve of claim 1,
   wherein a smallest angle between a normal to a plane defined by a smallest cross-section of the permanent inlet, and a normal to a plane defined by a smallest cross-section of the selectable outlet, and a smallest angle between a normal to a plane defined by a smallest cross-section of the selectable inlet, and a normal to a plane defined by a smallest cross-section of the permanent outlet, is between 70° and 90°.

7. The four-way exhaust gas valve of claim 1, wherein a deflection angle between the flow direction of the exhaust gas in the permanent inlet and the flow direction in the permanent outlet is less than 40°.

8. The four-way exhaust gas valve of claim 1, wherein a smallest cross-sectional area of the permanent outlet differs from a smallest cross-sectional area of the permanent inlet by less than 10%.

9. The four-way exhaust gas valve of claim 1, wherein a smallest cross-sectional area of the selectable outlet differs from a smallest cross-sectional area of the selectable inlet by less than 10%.

10. The four-way exhaust gas valve of claim 1, wherein a smallest cross-sectional area of the permanent inlet is larger than a smallest cross-sectional area of the selectable inlet by more than 10%.

11. The four-way exhaust gas valve of claim 1, wherein a smallest cross-sectional area of the selectable outlet differs from a smallest cross-sectional area of the permanent inlet by less than 10%.

12. The four-way exhaust gas valve of claim 1, wherein the valve flap has oval shape with a smallest radius and a largest radius, and the pivot axis is arranged along the smallest radius, wherein the valve body has a inner wall, segments of which have the shape of a flattened rotation ellipsoid, the rotational axis of which is larger than or equal to the shorter diameter of the valve flap, wherein a largest diameter of the valve body is larger than or equal to the longer diameter of the valve flap, wherein the pivot axis of the valve flap is coaxial to the rotational axis of the rotation ellipsoid.

13. The four-way exhaust gas valve of claim 1, wherein an inner wall of the valve body is coated with a resilient material, wherein a coating thickness of the resilient material is less than 1 mm and in particular is less than 0.5 mm.

14. A vehicle, comprising:
an internal combustion engine having a exhaust gas outlet;
a latent heat reservoir;
a silencer; and
a four-way exhaust gas valve comprising:
a permanent inlet;
a permanent outlet;
a selectable outlet;
a selectable inlet; and
a valve flap pivotable between a first sealing position and a second sealing position, wherein the valve flap is optionally plane, the valve flap for switching between a first mode of operation in which exhaust gas entering through the permanent inlet is directly guided to the permanent outlet, and a second mode of operation in which exhaust gas entering through the permanent inlet is discharged through the selectable outlet, and exhaust gas re entering through the selectable inlet is discharged through the permanent outlet;
wherein a pivot axis of the valve flap is arranged between the permanent inlet and the selectable inlet, and between the permanent outlet and the selectable outlet, and transects a valve body of the four-way exhaust gas valve;
wherein a first flow direction of the exhaust gas in one element selected from the inlets and outlets, lies in a different plane than flow directions in the remaining inlets and outlets, respectively, wherein the flow directions in the remaining inlets and outlets, respectively, are mutually coplanar,
wherein the permanent inlet of the four-way exhaust gas valve is connected to the exhaust gas outlet of the internal combustion engine;
wherein the permanent outlet of the four-way exhaust gas valve is connected to the silencer; and
wherein the selectable inlet and the selectable outlet of the four-way exhaust gas valve are connected to the latent heat reservoir.

15. The four-way exhaust gas valve of claim 1, wherein a smallest angle between the flow direction of the exhaust gas in the selectable inlet and the flow direction of the exhaust gas in the selectable outlet, is less than 70°.

16. The four-way exhaust gas valve of claim 1, wherein a smallest angle between the flow direction of the exhaust gas in the permanent inlet and the flow direction of the exhaust gas in the permanent outlet, is between 70° and 90°.

17. The four-way exhaust gas valve of claim 1, wherein a smallest angle between the flow direction of the exhaust gas in the permanent inlet and the flow direction of the exhaust gas in the selectable outlet, respectively, and a smallest angle between the flow direction of the exhaust gas in the selectable inlet and the flow direction of the exhaust gas in the permanent outlet, is between 70° and 90°.

18. The four-way exhaust gas valve of claim 1, wherein a smallest cross-sectional area of the selectable outlet differs from a smallest cross-sectional area of the permanent outlet by less than 10%.

19. A four-way exhaust gas valve, comprising:
a permanent inlet adapted to be connected to an exhaust gas outlet of an internal combustion engine;
a permanent outlet adapted to be connected to a silencer;
a selectable outlet adapted to be connected to a latent heat reservoir;
a selectable inlet adapted to be connected to a latent heat reservoir; and
a valve flap pivotable between a first sealing position and a second sealing position, wherein the valve flap is plane, the valve flap for switching between a first mode of operation in which exhaust gas entering through the permanent inlet is directly guided to the permanent outlet, and a second mode of operation in which exhaust gas entering through the permanent inlet is discharged through the selectable outlet, and exhaust gas re entering through the selectable inlet is discharged through the permanent outlet;
wherein a pivot axis of the valve flap is arranged between the permanent inlet and the selectable inlet, and between the permanent outlet and the selectable outlet, and transects a valve body of the four-way exhaust gas valve;
wherein a first flow direction of the exhaust gas in one element selected from the inlets and outlets, lies in a different plane than flow directions in the remaining inlets and outlets, respectively, wherein the flow directions in the remaining inlets and outlets, respectively, are mutually coplanar;
wherein the flow direction of the exhaust gas in the permanent inlet together with the flow direction of the exhaust gas in the selectable outlet defines a first deflection plane, and the flow direction of the exhaust gas in the selectable inlet together with the flow direction of the exhaust gas in the permanent outlet defines a second deflection plane, and wherein the first deflection plane and the second deflection plane form an inter-planar angle of more than 20° and up to 90°;
wherein a smallest cross-sectional area of the permanent outlet differs from a smallest cross-sectional area of the permanent inlet by less than 10%;
wherein a smallest cross-sectional area of the selectable outlet differs from a smallest cross-sectional area of the selectable inlet by less than 10%; and
wherein a smallest cross-sectional area of the permanent inlet is larger than a smallest cross-sectional area of the selectable inlet by more than 10%.

20. The vehicle of claim 14, the internal combustion engine having an exhaust gas turbo charger.

21. The vehicle of claim 14, the silencer having at least one of an upstream catalytic converter or an upstream diesel particulate filter.

22. The four-way exhaust gas valve according to claim 1, wherein the valve flap is plane.

23. The four-way exhaust gas valve of claim 1, wherein a smallest angle between a normal to a plane defined by a smallest cross-section of the permanent inlet, and a normal to a plane defined by a smallest cross-section of the permanent outlet, is less than 30°.

24. The four-way exhaust gas valve of claim 1, wherein the valve flap is coated with a resilient material, wherein a coating thickness of the resilient material is less than 1 mm and in particular is less than 0.5 mm.

25. The four-way exhaust gas valve of claim 1, wherein a smallest angle between the flow direction of the exhaust gas in the permanent inlet and the flow direction of the exhaust gas in the permanent outlet, is less than 30°.

* * * * *